ns Patent [19] [11] 3,985,772
Scheuermann et al. [45] Oct. 12, 1976

[54] 3-AMIDINOCOUMARIN DYES
[75] Inventors: Horst Scheuermann; Dietmar Augart, both of Ludwigshafen, Germany
[73] Assignee: BASF Aktiengesellschaft, Ludwigshafen (Rhine), Germany
[22] Filed: Jan. 14, 1974
[21] Appl. No.: 433,359

[30] Foreign Application Priority Data
Jan. 13, 1973 Germany............................ 2301738

[52] U.S. Cl. ................. 260/343.2 R; 260/247.2 B; 260/268 H; 260/293.58; 260/326.36
[51] Int. Cl.$^2$...................................... C07D 311/74
[58] Field of Search ............. 260/343.2 R, 247.2 B, 260/293.58, 326.36

[56]    References Cited
OTHER PUBLICATIONS
Haeusermann, H. et al., Chemical Abstr. vol. 56, 10158g.

*Primary Examiner*—Paul J. Killos
*Attorney, Agent, or Firm*—Johnston, Keil, Thompson & Shurtleff

[57] ABSTRACT
Dyes of the formula:

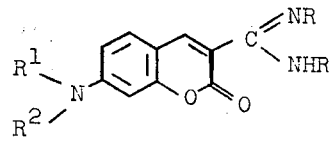

in which
R, $R^1$ and $R^2$ are unsubstituted or substituted alkyl, cycloalkyl, aralkyl or aryl and one R may also be hydrogen. The dyes are very suitable for dyeing acrylonitrile polymers.

4 Claims, No Drawings

3-AMIDINOCOUMARIN DYES

The Invention relates to dyes of the formula (I):

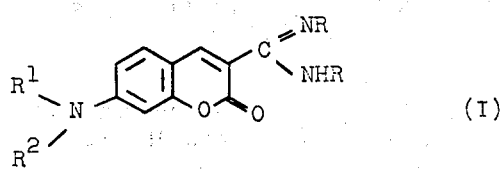

in which
  R is unsubstituted or substituted alkyl, cycloalkyl, aralkyl or aryl and one R may also be hydrogen; and
  $R^1$ and $R^2$ are unsubstituted or substituted alkyl, cycloalkyl, aralkyl or aryl, preferably neither R being hydrogen.

Examples of radicals R are: alkyl of one to eight carbon atoms which may bear hydroxy, alkoxy, dialkylamino or quaternary nitrogen as substituents; cycloalkyl of five to eight carbon atoms, aralkyl of seven to eight carbon atoms or aryl which may bear alkyl, alkoxy or halogen as substituents.

Specific examples of R are:
methyl, ethyl, n-propyl, isopropyl, n-butyl, isobutyl, hexyl, amyl, β-ethylhexyl, β-hydroxyethyl, γ-hydroxypropyl, β-methoxyethyl, β-ethoxyethyl, γ-methoxypropyl, γ-ethoxypropyl, γ-hexoxypropyl, γ-dimethylaminopropyl, γdiethylaminopropyl, γ-dibutylaminopropyl, cyclopentyl, cyclohexyl, 2-methylcyclohexyl, norbornyl, benzyl, phenylethyl, phenyl, phenyl bearing methyl, ethyl, methoxy, ethoxy, chloro or bromo as a substituent and radicals of the formulae:

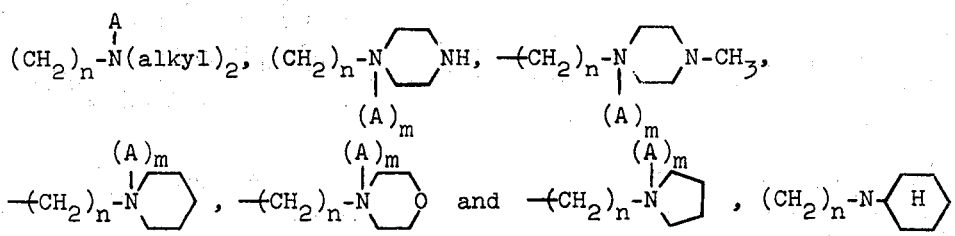

$n$ is 2 or 3, $m$ is 0 or 1, and A is methyl, ethyl, benzyl, β-hydroxyethyl or β-hydroxypropyl. For $m = 1$, the dyes have anions such as chloride, bromide, sulfate, metho- or ethosulfate, toluene-sulfonate, nitrate, thiocyanate, acetate, formiate or tetrachloro-zincate.

Examples of specific radicals for $R^1$ and $R^2$ are: methyl, ethyl, n-propyl, isopropyl, n-butyl, isobutyl, β-methoxyethyl, β-ethoxyethyl, β-methoxypropyl and β-ethoxypropyl, cyclohexyl, benzyl and phenylethyl.

Particular industrial importance attaches to compounds of formula (Ia):

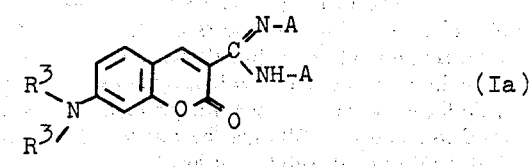

in which
  A is alkyl of four to eight carbon atoms, cycloalkyl or aralkyl and preferably butyl, hexyl, β-ethylhexyl, cyclohexyl, 2-methyl-cyclohexyl, benzyl or phenylethyl; and $R^3$ is alkyl of one to four carbon atoms and preferably methyl or ethyl.

Compounds of formula (I) in which R is not hydrogen may be prepared by reacting a compound of formula (II);

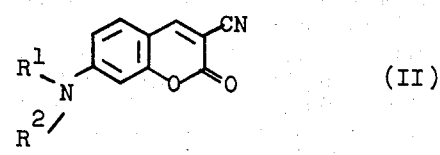

with an amine of the formula (III):

R—NH₂    (III)

in which R has the above meanings, or a salt thereof. Compounds having a quaternized group are prepared by subsequent quaternization according to known methods.

Compounds of formula (I) in which one R is hydrogen may be obtained in the form of salts from compounds of the formula (IIa):

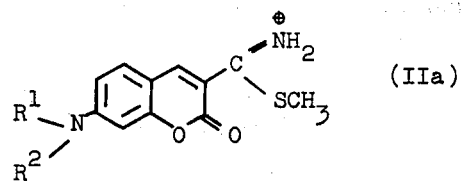

by reaction with compounds of formula (III) in which R is aryl. Compounds of formula (IIa) may be obtained by methods analogous to those known from the literature from compounds of the formula:

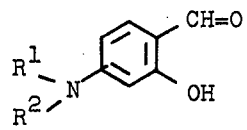

by reaction with ethoxycarbonylthioacetamide followed by S-methylation.

The components are conveniently reacted with one another in an excess of an amine of formula (III) as a solvent and it is advantageous to use some of the amine in the form of a salt.

A solvent may also be added, examples being alcohols, glycols, glycol ethers, hydrocarbons and halohydrocarbons. The reaction proceeds at elevated temperature, for example at from 50° to 200° C and preferably at from 80° to 180° C.

Examples of convenient amine salts are the benzenesulfonates and toluenesulfonates of amines of formula (III).

Examples of individual solvents which may be added are: butanol, ethylene glycol, diethylene glycol, ethylene glycol monomethyl, monoethyl and monobutyl ether, toluene, xylene chlorobenzene, dichlorobenzene, dimethylformamide and N-methylpyrrolidone.

Dyes of formula (I) are greenish yellow to reddish yellow and give on textile material of polyamides, cellulose acetates and polyesters and particularly on acrylonitrile polymers brilliant yellow dyeings of good fastness properties.

The following Examples illustrate the invention. References to parts and percentages are by weight unless stated otherwise.

EXAMPLE 1

24.2 parts of 3-cyano-7-diethylaminocoumarin, 53.2 parts of aniline p-toluenesulfonate and 40 parts of aniline are heated at 150° C for 2 hours. 120 parts of ethanol is added to the cold reaction mixture and the whole is boiled for a short time. After cooling the product is suction filtered and washed with alcohol and ether.

33.0 parts (80 % of theory) of the compound of the formula:

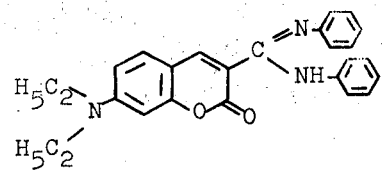

is obtained. After having been recrystallized from methyl glycol the substance melts at 209° to 211° C.

EXAMPLE 2

24.2 parts of 3-cyano-7-diethylaminocoumarin, 29.6 parts of p-anisidine p-toluenesulfonate and 40 parts of p-anisidine are heated for 2 hours at 150° C. The reaction mixture is processed as in Example 1. 36.9 parts (78 % of theory) of the compound of the formula:

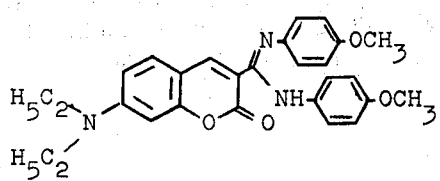

is obtained. After having been recrystallized from methyl glycol the substance melts at 206° to 207° C.

EXAMPLE 3

24.2 parts of 3-cyano-7-diethylaminocoumarin, 29.6 parts of p-toluidine p-toluenesulfonate and 40 parts of p-toluidine are heated for 3 hours at 150° C. The reaction product is worked up as described in Example 1.

36.3 parts (83 % of theory) of the compound of the formula:

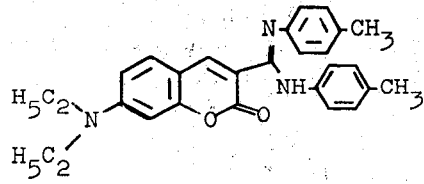

is obtained. After it has been recrystallized from methyl glycol the substance melts at 226° to 228° C.

EXAMPLE 4

10.7 parts of 3-cyanodimethylaminocoumarin, 27.1 parts of cyclohexylamine p-toluenesulfonate and 17 parts of cyclohexylamine are heated for 1 hour at 120° C. Beginning at 100° C, 80 parts of alcohol is added and the whole is allowed to stand for 16 hours at ambient temperature. 50 parts of water is added, and the precipitate is suction filtered, washed with water and dried in a drying cabinet at 40° C.

8.2 parts (42 % of theory) of the compound of the formula:

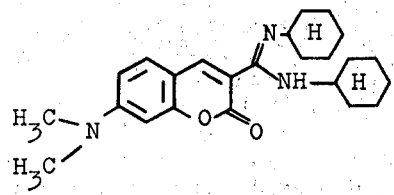

is obtained. After it has been recrystallized from 80 % alcohol the substance melts at 195° to 197° C.

EXAMPLE 5

21.4 parts of 3-cyano-7-dimethylaminocoumarin, 44 parts of phenylethylamine p-toluenesulfonate and 24.2 parts of phenylethylamine are heated for 1 hour at 80° C. 60 parts of 70 % alcohol is then added and 15 minutes later the whole is cooled to 0° C, and the product is suction filtered and washed with a little alcohol and ether.

19.8 parts (40 % of theory) of the compound of the formula:

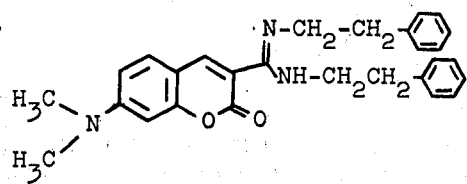

is obtained. After it has been recrystallized from 90 % alcohol the substance melts at 152° to 154° C.

EXAMPLE 6

10.7 parts of 3-cyano-7-dimethylaminocoumarin, 20.6 parts of 2-methylcyclohexylamine p-toluenesulfonate and 22.6 parts of 2-methylcyclohexylamine are heated at 120° C for 1 hour. The reaction mixture is stirred at ambient temperature with 120 parts of alcohol and poured into 400 parts of water. The residue which remains after the liquid has been decanted off the again dissolved in alcohol and precipitated by careful addition of water. After the product has been allowed to stand for 24 hours the product is suction filtered, washed with water and dried.

7.5 parts (35 % of theory) of the compound of the formula:

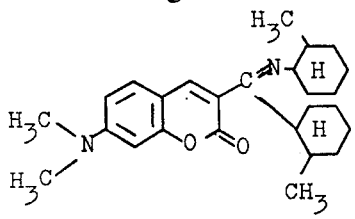

is obtained. After it has been recrystallized from 80 % alcohol the substance melts at 124 to 126 C.

The dyes characterized in the following Table by an indication of the substituents are also obtained by a method analogous to those described in Examples 1 to 6.

| Example | R | R | R | R | Hue on acrylonitrile polymers |
|---|---|---|---|---|---|
| 7 | CH | CH | —⟨phenyl⟩ | H | yellow |
| 8 | CH | CH | —⟨phenyl⟩—OCH | H | |
| 9 | CH | CH | —⟨phenyl⟩—CH | H | |
| 10 | C H | C H | —⟨phenyl⟩—Cl | H | |
| 11 | C H | C H | —⟨phenyl⟩—Br | H | |
| 12 | C H | C H | —⟨phenyl⟩—OC H | H | |
| 13 | C H | C H | —⟨phenyl⟩—C H | H | |
| 14 | C H | C H | —⟨phenyl⟩—OCH (meta) | H | |
| 15 | C H | C H | —⟨phenyl⟩—CH (meta) | H | |

| Example | R | R | R=R | Hue on acrylonitrile polymers |
|---|---|---|---|---|
| 16 | C H | C H | —⟨phenyl⟩—N(CH)(CH), H | yellow |
| 17 | CH | CH | —CH —CH —CH | |
| 18 | CH | CH | —(CH ) CH | |
| 19 | CH | CH | —(CH ) CH | |
| 20 | CH | CH | —CH —CH—(CH ) CH, with C H branch | |
| 21 | CH | CH | —(CH ) OCH | |
| 22 | CH | CH | —(CH )—N(CH)(CH) | |
| 23 | C H | C H | —⟨cyclohexyl-H⟩—CH | |

| | | | |
|---|---|---|---|
| 24 | C₂H₅ | C₂H₅ | —CH₂—CH₂—C₆H₄—OCH₃ | " |
| 25 | C₂H₅ | C₂H₅ | H₃C—cyclohexyl(H) | " |
| 26 | CH₃ | CH₃ | (CH₂)₃N(C₄H₉)₂ | " |
| 27 | CH₃ | CH₃ | (CH₂)₃N(C₂H₅)₂ | " |
| 28 | CH₃ | CH₃ | (CH₂)₃N-piperazine-N—CH₃ | " |
| 29 | CH₃ | CH₃ | (CH₂)₃N-morpholine | " |
| 30 | CH₃ | CH₃ | (CH₂)₃N-piperidine | " |
| 31 | CH₃ | CH₃ | (CH₂)₃—N-pyrrolidine | " |
| 32 | CH₃ | CH₃ | cyclopentyl(H) | " |
| 33 | C₂H₅ | C₂H₅ | (CH₂)₃N-piperazine-N—CH₃ | " |
| 34 | C₂H₅ | C₂H₅ | (CH₂)₃N-morpholine | " |
| 35 | C₂H₅ | C₂H₅ | (CH₂)₃N-piperidine | " |

EXAMPLE 36

24.2 parts of 3-cyano-7-diethylaminocoumarin, 33 parts of phenylethylamin p-toluenesulfonate and 20 parts of phenylethylamine are heated for 2 hours at 80° C. The reaction mixture is cooled to 50° C and brought into solution by adding 80 parts of alcohol. The whole is cooled to 0° C, 50 of water is added and the whole is stirred for another 2 hours. The precipitate is then suction filtered and washed with a small amount of 70 % alcohol. 14.1 parts (30 % of theory) of the compound of the formula:

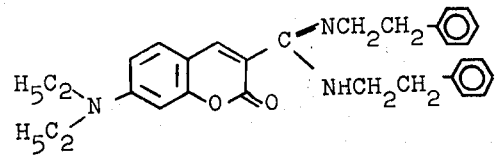

is obtained. After it has been recrystallized from a mixture of benzene and petroleum ether the substance melts at 100° to 102° C.

EXAMPLE 37

21.4 parts of 4-dimethylaminosalicylaldehyde, 30 parts of hexylamine p-toluenesulfonate and 20 parts of hexylamine are heated for 2 hours at 80° C. The reaction mixture is cooled to ambient temperature and stirred with 70 parts of 70 % alcohol. The product is suction filtered and washed with 50 % alcohol.

8.7 parts (21 % of theory) of the compound of the formula:

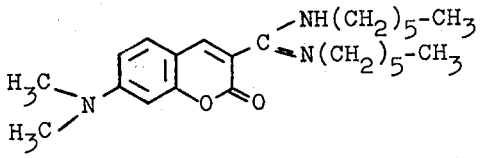

is obtained. After it has been recrystallized from petroleum ether the substance melts at 88° to 90° C.

EXAMPLE 38

12.1 parts of 3-cyano-7-diethylaminocoumarin, 16.3 parts of cyclohexylamine and 10 parts of cyclohexylamine are heated for 2 hours at 80° C. The product is worked up as described in Example 37.

6.8 parts (32 % of theory) of the compound of the formula:

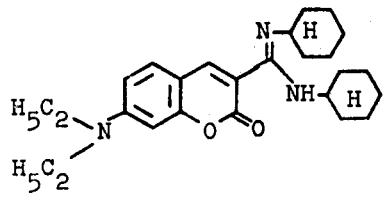

is obtained. The substance melts at 168° to 170° C. The following dyes are prepared by quaternizing the corresponding unquaternized dyes:

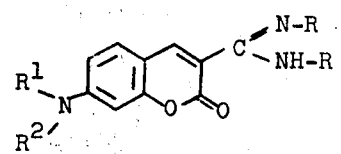

| Example | R¹ | R² | R | X⁻ | Hue |
|---|---|---|---|---|---|
| 39 | CH₃ | CH₃ | (CH₂)₂—N⁺(CH₃)₃ | CH₃SO₄⁻ | yellow |
| 40 | " | " | (CH₂)₂—N⁺(CH₃)(CH₃)(C₂H₅) | C₂H₅SO₄⁻ | " |
| 41 | " | " | (CH₂)₂—N⁺(C₄H₉)₂CH₃ | CH₃SO₄ | " |
| 42 | " | " | (CH₂)₂—N⁺(C₆H₁₁)(CH₃)₂ | CH₃SO₄ | " |
| 43 | " | " | (CH₂)₃—N⁺(CH₃)₃ | CH₃C₆H₄SO₃⁻ | " |
| 44 | " | " | (CH₂)₃—N⁺(C₂H₅)₃ | Br⁻ | " |
| 45 | " | " | (CH₂)₃—N⁺(C₂H₅)₂CH₂C₆H₅ | Cl⁻ | " |
| 46 | " | " | (CH₂)₃—N⁺(CH₃)(pyrrolidine) | CH₃SO⁻ | " |
| 47 | " | " | (CH₂)₃—N⁺(C₂H₅)(pyrrolidine) | C₂H₅SO₄⁻ | " |
| 48 | " | " | (CH₂)₃—N⁺(piperazine)N(CH₃)₂ | CH₃SO₄⁻ | " |
| 49 | " | " | (CH₂)₃—N⁺(CH₃)(morpholine) | CH₃SO₄⁻ | " |
| 50 | " | " | (CH₂)₃—N⁺(C₂H₅)(morpholine) | C₂H₅SO₄ | " |

-continued

| Example | R¹ | R² | R | X⁻ | Hue |
|---|---|---|---|---|---|
| 51 | " | " | (CH₂)₃—N⁺(morpholine)CH₂C₆H₅ | Cl⁻ | " |
| 52 | " | " | (CH₂)₃—N⁺(morpholine)CH₂CH₂OH | CH₃COO⁻ | " |
| 53 | " | " | (CH₂)₃—N⁺(morpholine)CH₂CHOHCH₃ | CH₃COO⁻ | " |
| 54 | " | " | (CH₂)₃—N⁺(piperidine)CH₃ | CH₃SO₄⁻ | " |
| 55 | " | " | (CH₂)₃—N⁺(piperidine)C₂H₅ | C₂H₅SO₄⁻ | " |
| 56 | " | " | (CH₂)₃—N⁺(piperidine)CH₂C₆H₅ | Cl⁻ | " |
| 57 | " | " | (CH₂)₃—N⁺(piperidine)CH₂CH₂OH | CH₃COO⁻ | " |
| 58 | " | " | (CH₂)₃—N⁺(piperidine)CH₂CHOH—CH₃ | CH₃COO⁻ | " |

The compounds having $R^1 = R^2 = C_2H_5$ differ only slightly from those having $R^1 = R^2 = CH_3$ and are prepared analogously.

We claim:
1. A dye having the formula

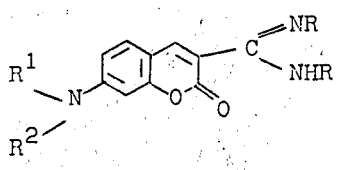

in which
R is benzyl, phenylethyl, phenyl or phenyl substituted by methyl, ethyl, methoxy, ethoxy, chlorine or bromine;
$R^1$ is alkyl of 1 to 4 carbon atoms;
$R^2$ is alkyl of 1 to 4 carbon atoms; and
$R^1$ and $R^2$ together with the nitrogen are

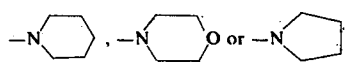

2. A dye as claimed in claim 1 wherein each of $R^1$ and $R^2$ represents methyl or ethyl.
3. A dye as claimed in claim 2 wherein R is phenylethyl.
4. The dye having the formula

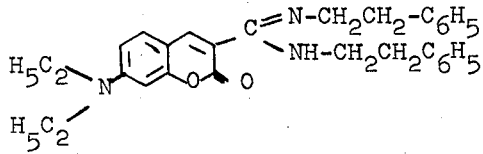

* * * * *